(12) United States Patent
Nagamine et al.

(10) Patent No.: US 6,433,829 B1
(45) Date of Patent: Aug. 13, 2002

(54) SIGNAL PROCESSING APPARATUS FOR SETTING UP VERTICAL BLANKING SIGNAL OF TELEVISION SET

(75) Inventors: Takatomo Nagamine, Chiba; Shinji Takahashi, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/313,353

(22) Filed: May 18, 1999

(30) Foreign Application Priority Data

May 26, 1998 (JP) ........................................... 10-144169

(51) Int. Cl.[7] ................................................ H04N 3/24
(52) U.S. Cl. ........................ 348/524; 348/521; 348/637
(58) Field of Search .............................. 348/637, 634, 348/521, 522, 524, 529, 530, 547, 548; H04N 5/06, 3/24, 3/227

(56) References Cited

U.S. PATENT DOCUMENTS 4,679,080 A * 7/1987 Bashford .................... 348/521
4,803,552 A 2/1989 Marin

FOREIGN PATENT DOCUMENTS

| JP | 4-3662 | * | 1/1992 | .......... H04N/3/227 |
| JP | 4-192971 | * | 7/1992 | ............ H04N/3/24 |
| JP | 63-219273 | * | 9/1998 | ............ H04N/3/24 |
| WO | 93/01681 | | 1/1993 | |

* cited by examiner

Primary Examiner—David E. Harvey
(74) Attorney, Agent, or Firm—Ronald P. Kananen, Esq.; Rader, Fishman & Grauer, PLLC (57) ABSTRACT

The signal processing apparatus for setting a vertical blanking signal of the television set that allows to set the beginning position and end position of a horizontal blanking signal irrespective of the numbers of lines in the vertical synchronous signal interval, comprising: an up counter for counting the vertical synchronous signal interval, synchronizing with the horizontal synchronous signal to lock forcedly the interlace signal to become a non-interlace signal; and a down counter for loading and down counting the count value of the up counter, wherein the down counter loads the data of the up counter immediately before the up counter is reset at a timing of the vertical synchronous signal and down counts the data which is loaded in the down counter as the initial value.

4 Claims, 9 Drawing Sheets

SIGNAL PROCESSING APPARATUS FOR SETTING UP VERTICAL BLANKING SIGNAL OF TELEVISION SET

BACKGROUND OF THE INVENTION

1. Field of the Invention

The present invention relates to a signal processing apparatus that allows the "beginning" position and the "end" position of a vertical blanking signal of a television signal to be set.

2. Description of the Related Art

In a deflecting system of a television (TV) set, a circuit block that generates a horizontal drive (H_DRV) signal and a vertical drive (V_DRV) signal also generates a vertical blanking signal. Conventional TV sets have their designated signal formats such as a NTSC format and a PAL format. Thus, in the conventional TV sets, it is necessary to select only a picture blanking timing.

However, in recent years, a point-scan TV set and a multi-scan TV set have been developed. The point-scan TV set can display pictures that correspond to several signal formats. The multi-scan TV set can display pictures of any signal standard in its deflecting range. In these TV sets, the timing of the vertical blanking signal should be freely set.

Timings necessary for generating the vertical blanking signal are the "beginning" and "end" positions thereof. The "beginning" position of the vertical blanking signal is necessary for hiding the lower portion of a picture on the TV screen. On the other hand, the "end" position of the vertical blanking signal is necessary for hiding the upper portion of a picture on the TV screen.

Figure 1:
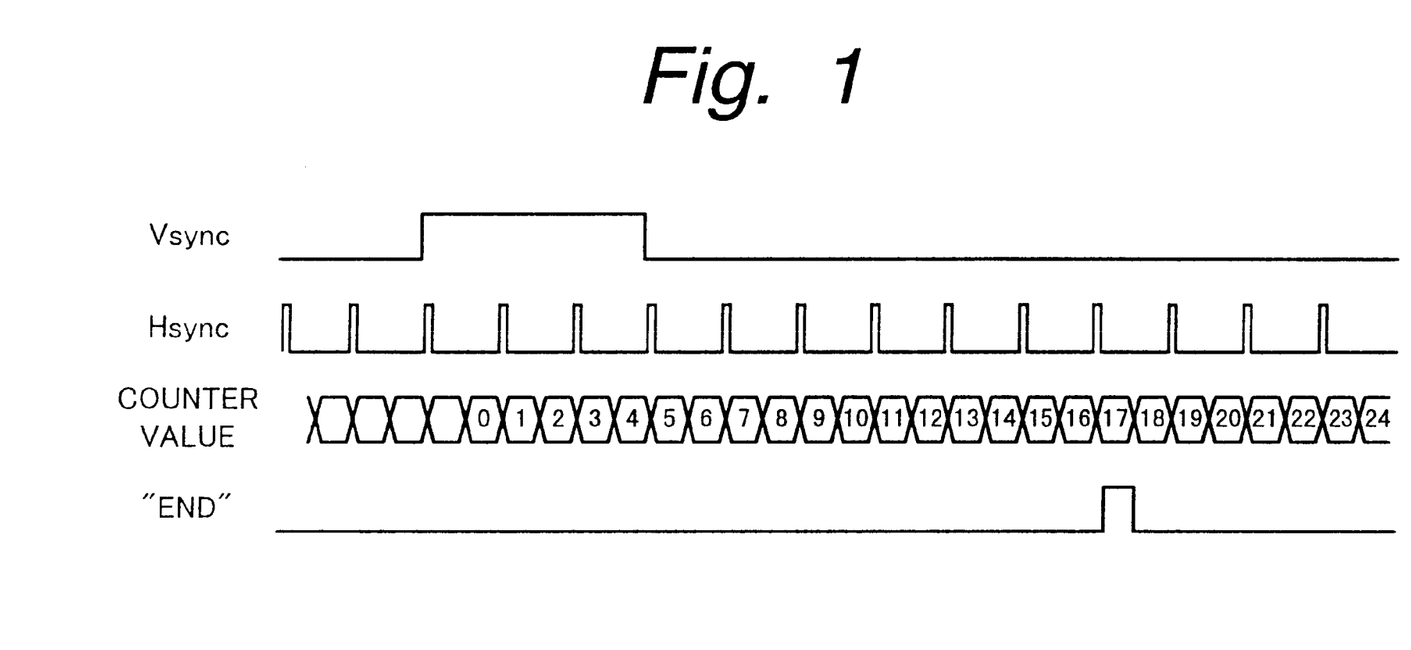
FIG. 1 is a timing chart for explaining a conventional signal processing apparatus.

Technically, it is easy to generate a timing of the "end" position of the vertical blanking signal. As shown in FIG. 1, a counter that starts counting with a vertical synchronous signal (Vsync) and counts up the number of horizontal synchronous signals (Hsync) is used. When the count value of the counter becomes a predetermined value, a timing pulse that represents the "end" position of the vertical signal is output.

Figure 2:
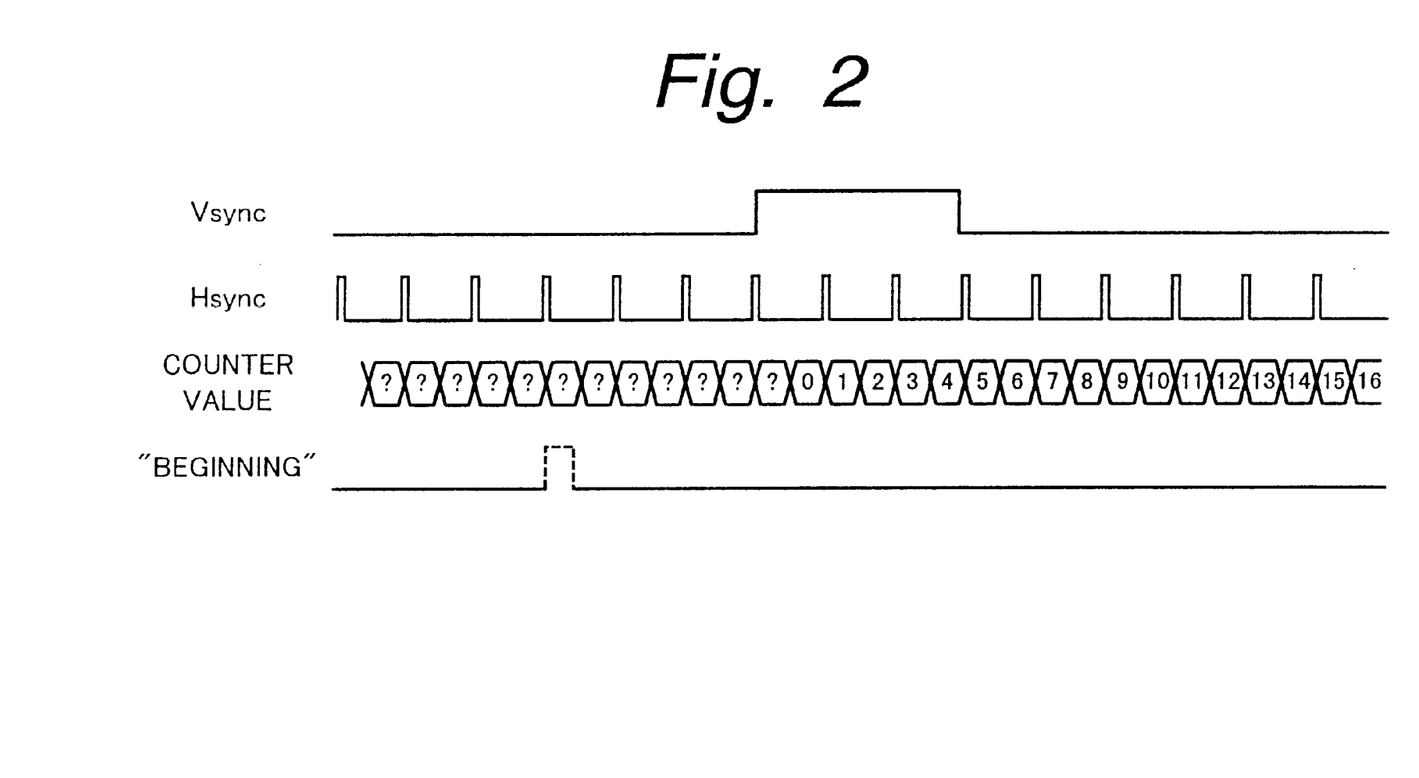
FIG. 2 is a timing chart for explaining the conventional signal processing apparatus.

On the other hand, it is difficult to generate a timing for the "beginning" position of the vertical blanking signal. As shown in FIG. 2, when the number of picture signal formats is one, since the last value of the above-described counter (namely, the immediately preceding value of the vertical synchronous signal) is known, the "beginning" position can be obtained by the reverse-calculation of the last value of the counter. However, when there are various picture signal formats, the last value of the counter is unknown. Thus, the "beginning" position cannot be obtained by the reverse-calculation. Consequently, the "beginning" position of a vertical synchronous signal is inevitably treated as the "beginning" position of a vertical blanking signal. It is difficult to generate a timing of the "beginning" position of a vertical blanking signal earlier than a vertical synchronous signal. Thus, the "beginning" position of the vertical blanking signal cannot be freely set.

Figure 3A:
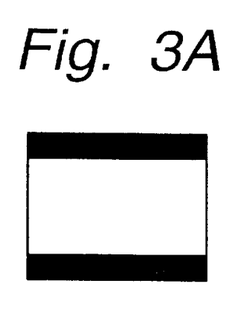
FIGS. 3A and 3B are schematic diagrams for explaining a processing apparatus under scan.
Figure 3B:
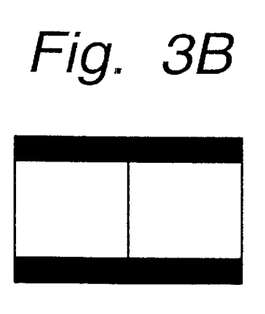

However, in recent TV sets, as shown in FIG. 3A, a 16:9 picture signal is displayed on a TV set with an aspect ration of 4:3. In contrast, as shown in FIG. 3B, two pictures of 4:3 picture signals are horizontally displayed in a row on one wide TV set with an aspect ratio of 16:9. In other words, raster scan pictures are displayed as under scan pictures. When only over-scan pictures are displayed, inaccurate timings of the "beginning" and "end" positions of the vertical blanking signal are permitted to some extent. However, in the case of under-scan pictures, a vertical blanking signal cannot be hidden. Thus, the timings of the "beginning" and "end" positions of the vertical blanking signal are very important. In addition, the timings of the "beginning" position and the "end" position of a vertical blanking signal should be flexibly selected.

Moreover, conventional TV sets cannot deal with irregular modes of which an interlace signal is forcedly locked to the state of a non-interlace signal or vice versa.

OBJECTS AND SUMMARY OF THE INVENTION

Therefore, an object of the present invention is to provide a signal processing apparatus that allows the "beginning" position and "end" position of a vertical blanking signal to be set irrespective of an input signal and of the number of lines between vertical synchronous signals.

Another object of the present invention is to provide a signal processing apparatus that can deal with a forcedly locked interlace signal or a forcedly locked non-interlace signal.

A first aspect of the present invention is a signal processing apparatus for setting a vertical blanking signal of an input television signal, comprising a first counter, synchronized with a horizontal synchronous signal, for counting up a count value thereof starting from a first value corresponding to a predetermined clock signal whose frequency is higher than the frequency of the horizontal synchronous signal, and a second counter for counting down a count value thereof starting from a second value, wherein immediately before the count value of the first counter is reset at a particular timing corresponding to the vertical synchronous signal and the horizontal synchronous signal, the second counter loads the count value of the first counter as the second value, and wherein immediately before the second value is loaded to the second counter, the count value of the second counter becomes the first value.

A second aspect of the present invention is a signal processing apparatus for setting a vertical blanking signal of an input television signal, comprising a clock signal generating means, synchronized with a horizontal synchronous signal, for generating a second clock signal corresponding to a first clock signal and a field signal, the first clock signal operating at a frequency higher than the frequency of the horizontal synchronous signal, a first counter for counting up a count value thereof starting from a first value corresponding to the second clock signal, and a second counter for counting down a count value thereof starting from a second value corresponding to the first clock signal, wherein immediately before the count value of the first counter is reset at a particular timing corresponding to a vertical synchronous signal and the second clock signal, the second counter loads the count value of the first counter as the second value.

The count value immediately before the resetting of the up counter is loaded to the down counter. The down counter counts down the count value starting from the loaded count value. When the value of the down counter becomes a predetermined value, it is determined that the vertical blanking signal "begins". Thereafter, when the up counter becomes a predetermined value, it is determined that the vertical blanking signal "ends". With a field signal, a timing of a deviation of a ½ horizontal interval is fixed to a horizontal synchronous signal. Thus, a forced non-interlace mode and a forced interlace mode can be dealt.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 4:
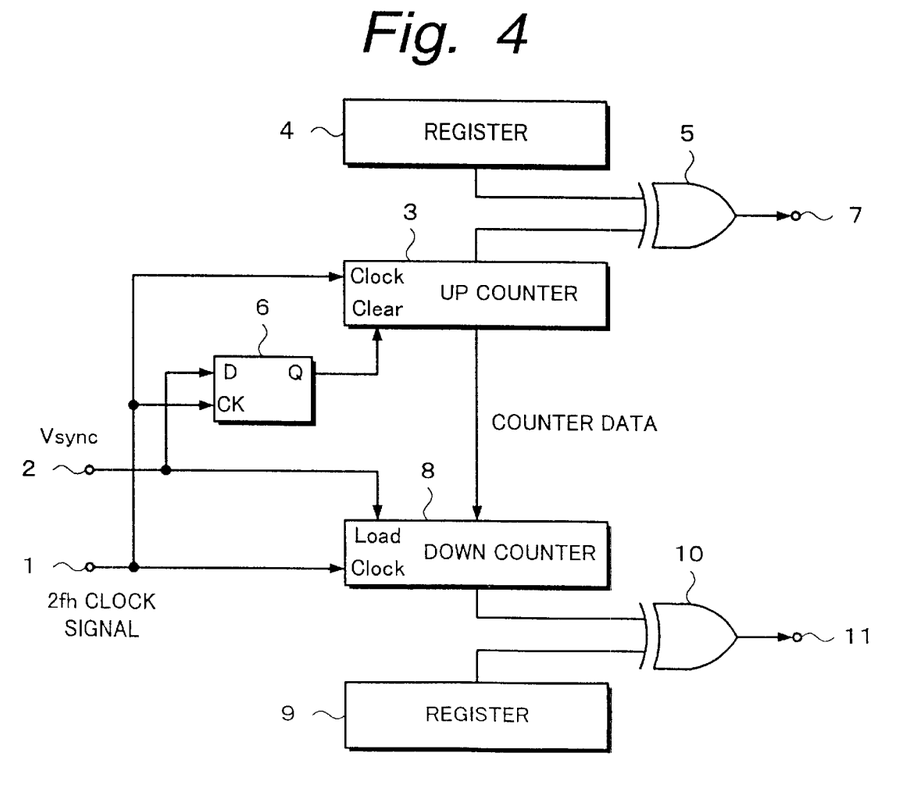
FIG. 4 is a block diagram showing a first embodiment of a signal processing apparatus to which the present invention is applied.

Next, with reference to the accompanying drawings, a first embodiment of the present invention will be described. FIG. 4 shows the structure of the first embodiment of the present invention. A 2fh clock signal is supplied from an input terminal 1. The 2fh clock signal is a clock signal whose frequency is twice as high as the horizontal frequency fh. The 2fh clock signal is supplied to a clock terminal of an up counter 3, a clock terminal CK of a D flip-flop 6, and a clock terminal of a down counter 8. A vertical synchronous signal (Vsync) is supplied from an input terminal 2. The vertical synchronous signal is supplied to a D (data input) terminal of a D flip-flop 6 and a load terminal of the down counter 8. Data is supplied from a Q (output) terminal of the D flip-flop 6 to a clear terminal of the up counter 3.

The up counter 3 counts up the count value corresponding to the 2fh clock signal. The count value of the up counter 3 is supplied to a first input terminal of an EX-OR gate 5 and the down counter 8. A register 4 that sets the "end" position of a vertical blanking signal is connected to a microcomputer through a bus line (not shown). The microcomputer sets a value of the "end" position of the vertical blanking signal. The set value is supplied to a second input terminal of the EX-OR gate 5. The EX-OR gate 5 EX-ORs the count value of the up counter 3 and the value of the register 4. When they match, data of which all bits are "0S" is output from an output terminal 7. The output data is used for the timing of the "end" position of the vertical blanking signal.

The down counter 8 counts down the count value supplied from the up counter 3 corresponding to the 2fh clock signal. The count value of the down counter 8 is supplied to a first input terminal of an EX-OR gate 10. A register 9 that sets the "beginning" position of the vertical blanking signal is connected to the microcomputer through the bus line (not shown). The microcomputer sets a value of the "beginning" position of the vertical blanking signal. The set value is supplied to a second input terminal of the EX-OR gate 10. The EX-OR gate 10 EX-ORs the count value of the down counter 8 and the value of the register 9. When they match, data of which all bits are "0S" is output from an output terminal 11. The output data is used for the timing of the "beginning" position of the vertical blanking signal.

In the first embodiment, the number of bits of each of the up counter 3 and the down counter 8 accords to the number of lines counted in one vertical synchronous signal interval in consideration of a maximum number of signal formats. These counters 3 and 8 operate corresponding to the 2fh clock signal. It should be noted that these counters 3 and 8 may operate corresponding to any clock signal that synchronizes with a horizontal synchronous signal. The up counter 3 is a counter that determines the "end" position of the vertical blanking signal. The count value of the up counter 3 is reset at a timing of which the vertical synchronous signal is delayed by one clock period. However, the reset value is not "0", but "1". In other words, the up counter 3 counts up the count value starting from "1". The count value of the up counter 3 is used to generate the timing of the "end" position of the vertical blanking signal. At a timing of a vertical synchronous signal one clock period prior of which the counter is reset with the next vertical synchronous signal, the count value of the up counter 3 is loaded to the down counter 8. The down counter 8 counts down the count value starting from the loaded count value.

Figure 5A:
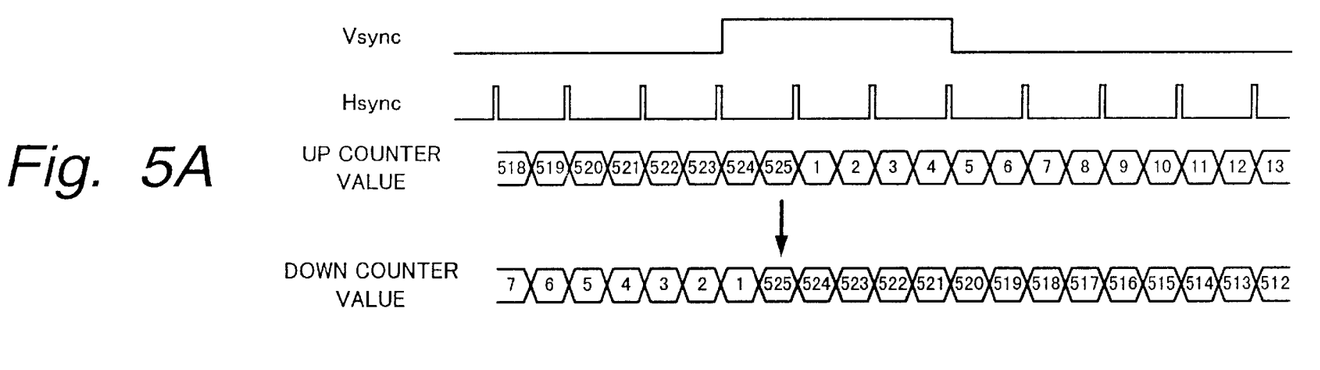
FIGS. 5A and 5B are timing charts of the first embodiment of the signal processing apparatus to which the present invention is applied.
Figure 5B:
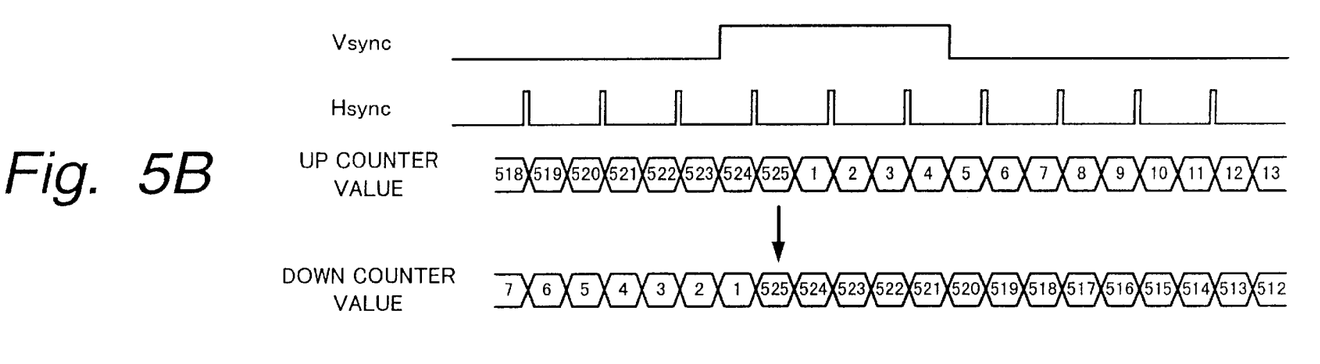

FIGS. 5A and 5B show timing charts of the "beginning" position and "end" position of a vertical blanking signal according to the first embodiment. In the example shown in FIGS. 5A and 5B, the number of lines of one vertical synchronous signal interval are 262.5. In FIGS. 5A and 5B, "UP COUNTER VALUE" represents the count value of the up counter 3. Since the up counter 3 operates corresponding to the 2fh clock signal, the count value in one vertical synchronous signal interval is 525. Immediately after a vertical synchronous signal goes high, when a horizontal synchronous signal goes high, the count value of the up counter 3 is reset. Thus, the up counter 3 counts up the count value starting from "1". Immediately before the count value of the up counter 3 is reset, a multiple of the line number of the current input signal is obtained as the count value of the up counter 3. At the moment, the count value of the up counter 3 is loaded to the down counter 8. The down counter counts down the count value starting from the loaded count value.

By repeating the relation, immediately before the count value of the up counter 3 is loaded to the down counter 8, the count value of the down counter 8 becomes "1". Thus, the count value of which the count value of the up counter 3 is reversed is obtained. As are clear from the timing charts shown in FIGS. 5A and 5B, the count value of the up counter 3 is symmetrical to the count value of the down counter 8 with respect to count value "525". The reset value of the up counter 3 is "1" because the rising point of the vertical synchronous signal at the position of the count value "525" is virtually set to "0". Thus, when a vertical blanking signal is generated, it is very convenient to designate the "beginning" position and "end" position of the vertical blanking signal corresponding to the number of horizontal synchronous signals counting from the rising state of a vertical synchronous signal.

In the example shown in FIGS. 5A and 5B, since the number of lines in one vertical synchronous signal interval are 262.5, the relation between a count value and a horizontal synchronous signal deviates by a ½ horizontal synchronous signal interval in two adjacent vertical synchronous signal intervals. For example, in the first vertical synchronous signal interval, the count value of the up counter 3 synchronizes with the leading edge of each horizontal synchronous signal and counts up as "1", "2", . . . "524", and "525". In the next vertical synchronous signal interval, as shown in FIG. 5B, the count value of the up counter 3 synchronizes with the leading edge of each horizontal synchronous signal with a deviation of a ½ horizontal interval and counts up as "1", "2", . . . "524", and "525".

Figure 6:
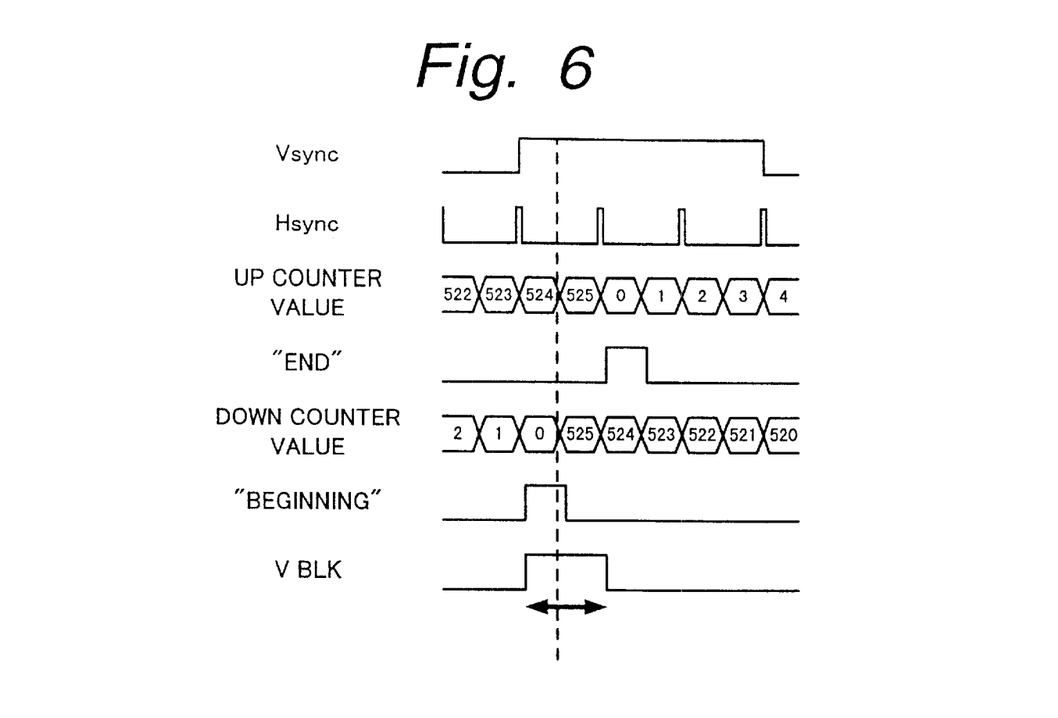
FIG. 6 is a timing chart of an example to which the present invention is applied.

FIG. 6 is a timing chart showing an example of which the microcomputer causes the registers 4 and 9 to output timing signals representing the "end" position and "beginning" position of the vertical blanking signal when the count value becomes "0". At the point, as shown in FIG. 6, when the count value of the up counter 3 becomes "0" that is the reset value thereof, the timing of the "end" position of the vertical blanking signal is generated. Likewise, when the count value of the down counter 8 becomes "0S," that is the reset value thereof, and the timing of the "beginning" position of the vertical blanking signal is generated. Even if the vertical blanking signal is set from the count value "0" of the down counter 8 corresponding to an earlier portion of the vertical synchronous signal to the count value "0" of the up counter 3 corresponding to a later portion thereof, the vertical blanking signal interval has a width of one horizontal interval. There is a difference of an offset between the set value and the width of the vertical blanking signal.

Figure 7:
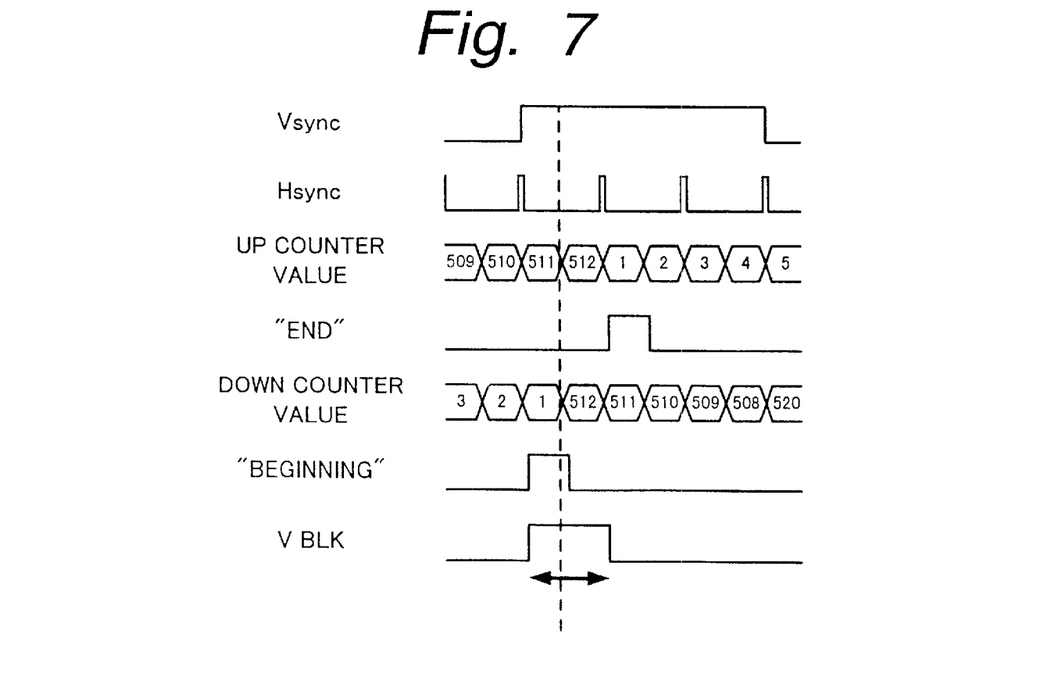
FIG. 7 is a timing chart of another example to which the present invention is applied.

FIG. 7 is a timing chart showing an example of which timing signals representing the "end" position and "beginning" position of the vertical blanking signal are output when the count value of the down counter 8 is "1" and the count value of the up counter 3 is "1", respectively. The reset values of the up counter 3 and the down counter 8 are set to "1". In addition, the vertical blanking signal is set from the count value "1" of the down counter 8 corresponding to an earlier portion of the vertical synchronous signal to the count value "1" of the up counter 3 corresponding to a later portion thereof. The vertical blanking signal has a width of one horizontal interval from the count value "1" of the down counter 8 corresponding to the earlier portion of the vertical synchronous signal to the count value "1" of the up counter 3 corresponding to the later portion thereof. The set value matches the width of the vertical blanking signal.

When the vertical blanking signal is from L lines before the vertical synchronous signal to M lines thereafter, in L lines before the vertical synchronous signal, the down counter 8 generates the timing signal representing the "beginning" position of the vertical blanking signal. In M lines after the vertical synchronous signal, the up counter 3 generates the timing signal representing the "end" position of the vertical blanking signal. In other words, the vertical blanking signal can be freely generated.

Next, a second embodiment of the present invention will be described. The second embodiment is a modification of the first embodiment of the present invention. As special modes, a forced non-interlace mode and a forced interlace mode may be used. In the forced non-interlace mode, an interlace signal on a screen of a text image or a game image is forcedly locked to the state of a non-interlace signal. In the forced interlace mode, a non-interlace signal is forcedly locked to the state of an interlace signal.

Figure 8:
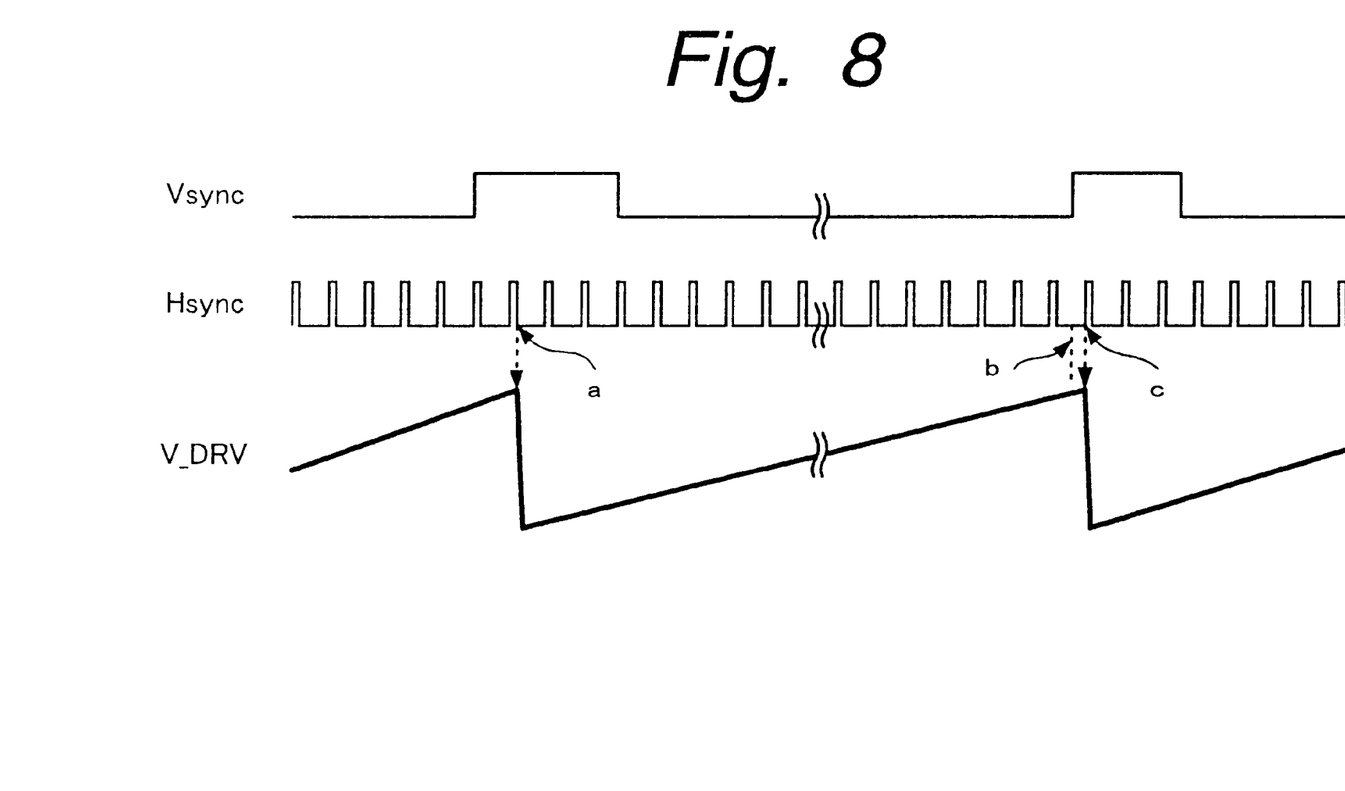
FIG. 8 is a timing chart for explaining a signal processing apparatus to which the present invention is applied.

FIG. 8 is a timing chart showing an example of the forced non-interlace mode of which an interlace signal is forcedly locked to the state of a non-interlace signal. When an input interlace signal is normally locked, the reset timing of the vertical drive (V_DRV) signal deviates by a ½ horizontal interval every vertical synchronous signal. Thus, the reset timing is forcedly synchronized with the horizontal synchronous signal. In reality, when the vertical drive signal is reset in synchronization with the horizontal synchronous signal represented by the portion a shown in FIG. 8, the next vertical drive signal is reset at the portion b shown in FIG. 8. However, the vertical drive signal is forcedly reset at the portion c shown in FIG. 8. Likewise, in the forced non-interlace mode, all reset timings are synchronized with a deviation of a ½ horizontal interval against the horizontal synchronous signal.

Figure 9:
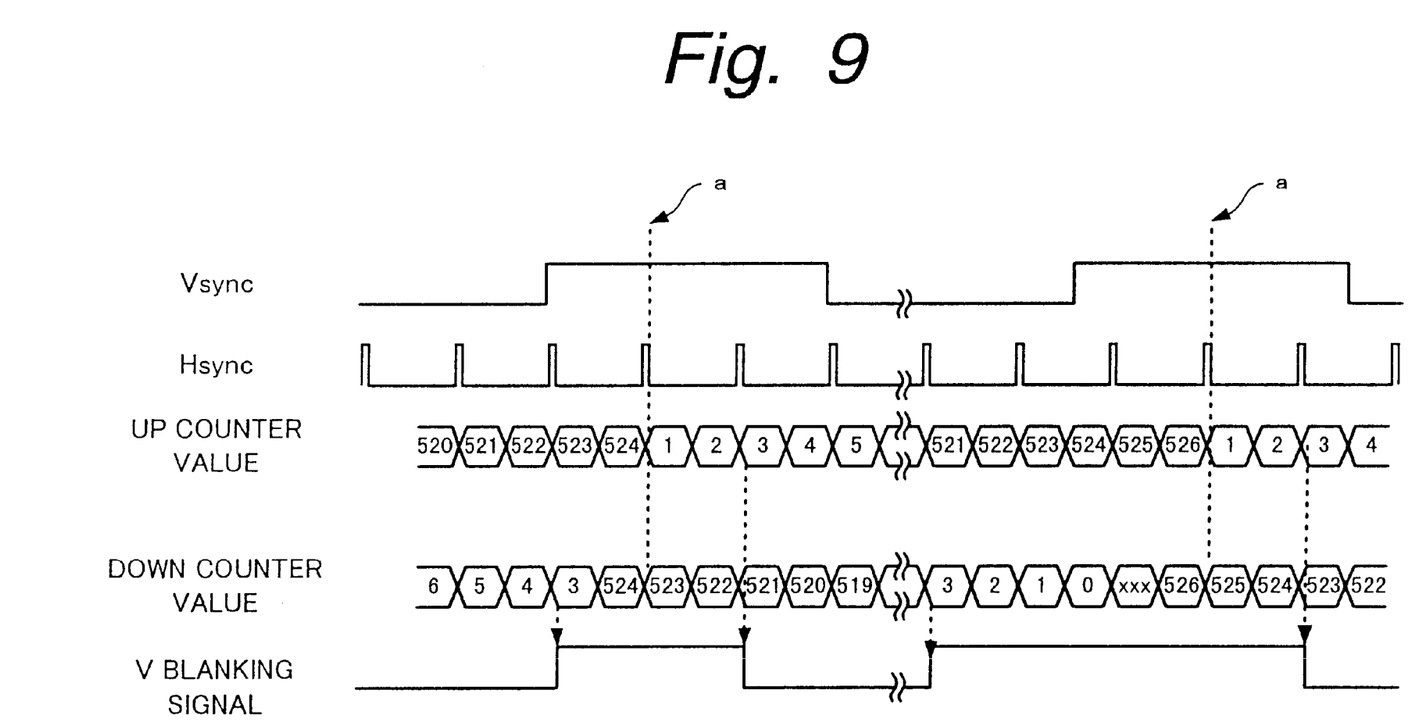
FIG. 9 is a timing chart for explaining a signal processing apparatus to which the present invention is applied.

FIG. 9 is a timing chart showing a vertical blanking signal generated by the system according to the first embodiment. In the timing chart shown in FIG. 9, a vertical blanking signal is from three lines before a vertical synchronous signal to three lines thereafter. A horizontal synchronous signal represented by the portion a shown in FIG. 9 resets the count value of the up counter 3. In a vertical synchronous signal of a particular field, when the count value of the up counter 3 is "523", the vertical blanking signal "begins". When the count value of the up counter 3 is "3", the vertical blanking signal "ends". In the next vertical synchronous signal, when the count value of the up counter 3 is "521", the vertical blanking signal "begins". When the count value of the up counter 3 is "3", the vertical blanking signal "ends". Although the timing of the "end" position of the vertical blanking signal corresponding to the first vertical synchronous signal is the same as that corresponding to the next vertical synchronous signal, the timing of the "beginning" position of the former is different from that of the latter. Thus, the number of lines of which the picture signal is not blanked deviates by one horizontal interval of (523−3)/2= 260 lines and (521−3)/2=259 lines. In other words, the timings of the "beginning" positions of the vertical blanking signals deviate by one horizontal interval.

Figure 10:
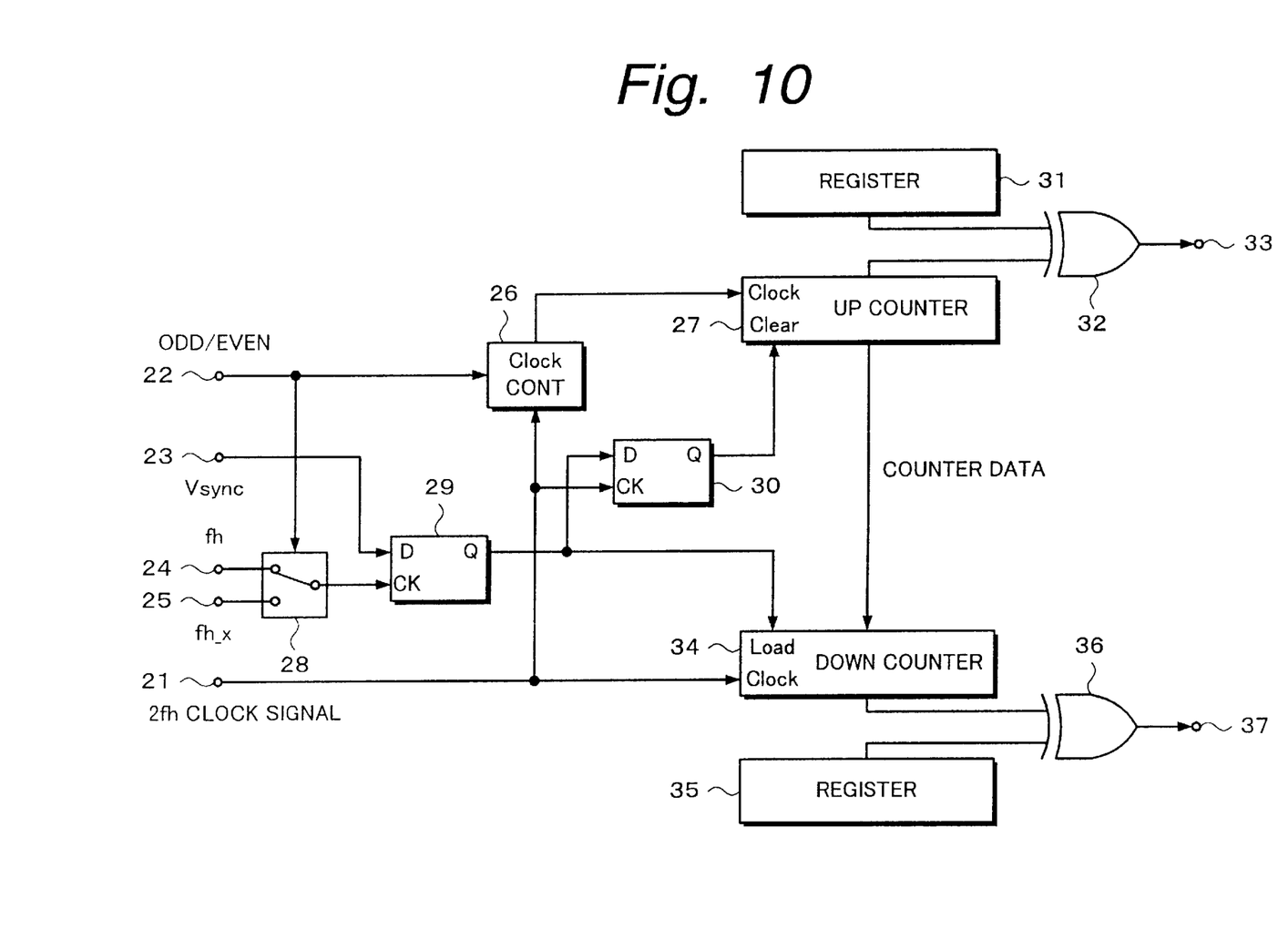
FIG. 10 is a block diagram showing a second embodiment of a signal processing apparatus to which the present invention is applied.

FIG. 10 shows the structure of the second embodiment. In the second embodiment, the "beginning" position and "end" position of a vertical blanking signal can be set in the forced interlace mode or forced non-interlace mode. In FIG. 10, a 2fh clock signal is supplied from an input terminal 21. The 2fh clock signal is supplied to a clock terminal of a clock counter 26, a clock terminal of a D flip-flop 30, and a clock terminal of a down counter 34. An ODD/EVEN signal is supplied to an input terminal 22. The ODD/EVEN signal is supplied to the clock counter 26 and a switch circuit 28. A vertical synchronous signal is supplied from an input terminal 23. The input terminal 23 is supplied to a D terminal of a D flip-flop 29. A fh clock signal is supplied from an input terminal 24. The fh clock signal is a clock signal with the same frequency as a horizontal frequency fh. The fh clock signal is supplied to a first input terminal of the switch circuit 28. A fh_x clock signal is supplied from an input terminal 25. The fh_x clock signal is supplied to a second input terminal of the switch circuit 28. The fh_x clock signal is an inverted clock signal of the fh clock signal.

The clock counter 26 generates a clock signal with the ODD/EVEN signal supplied from the input terminal 22 and the 2fh clock signal. The generated clock signal is supplied to a clock terminal of the up counter 27. The switch circuit 28 selects one of the fh clock signal and the fh_x clock signal corresponding to the ODD/EVEN signal. The selected fh clock signal or fh_x clock signal is supplied to a clock terminal of the D flip-flop 29. An output signal of the D flip-flop 29 is supplied to a D terminal of a D flip-flop 30 and a load terminal of a down counter 34. An output signal of the D flip-flop 30 is supplied to a clear terminal of the up counter 27.

The up counter 27 counts up the count value corresponding to the clock signal supplied to the clock terminal thereof. The count value is supplied to a first terminal of an EX-OR gate 32. A register 31 that sets the "end" position of a register vertical blanking signal is connected to a microcomputer through a bus line (not shown). The microcomputer sets a value of the "end" position of the vertical blanking signal. The set value is supplied to a second input terminal of the EX-OR gate 32. The EX-OR gate 32 EX-ORs the count value of the up counter 27 and the value of the register 31. When they match, data of which all bits are "0s" is output from an output terminal 33. The data is used for the timing of the "end" position of the vertical blanking signal.

The down counter 34 counts down the count value corresponding to the 2fh clock signal supplied to the clock terminal thereof. The count value is supplied to a first input terminal of an EX-OR gate 36. A register 35 that sets the "beginning" position of the register vertical blanking signal is connected to the microcomputer through the bus line (not shown). The microcomputer sets a value of the "beginning" position of the vertical blanking signal. The set value is supplied to a second input terminal of the EX-OR gate 36. The EX-OR gate 36 EX-ORs the count value of the down counter 34 and the value of the register 35. When they match, data of which all bits are "0s" is output from an output terminal 37. The output data is used for the timing of the "beginning" position of the vertical blanking signal.

The D flip-flop 29 generates the timing of the forced interlace mode. The clock signal supplied to the clock terminal of the D flip-flop 29 is switched over field by field. For example, when the fh clock signal is input in a particular field, the fh_x clock signal that is an inverted clock signal of the fh clock signal is input in the next field. Since the input timing of the vertical synchronous signal is deviated by a ½ horizontal interval for each vertical synchronous signal, the reset timing of the vertical drive signal and the reset timing of the up counter 27 can be generated as shown in FIG. 8.

Figure 11:
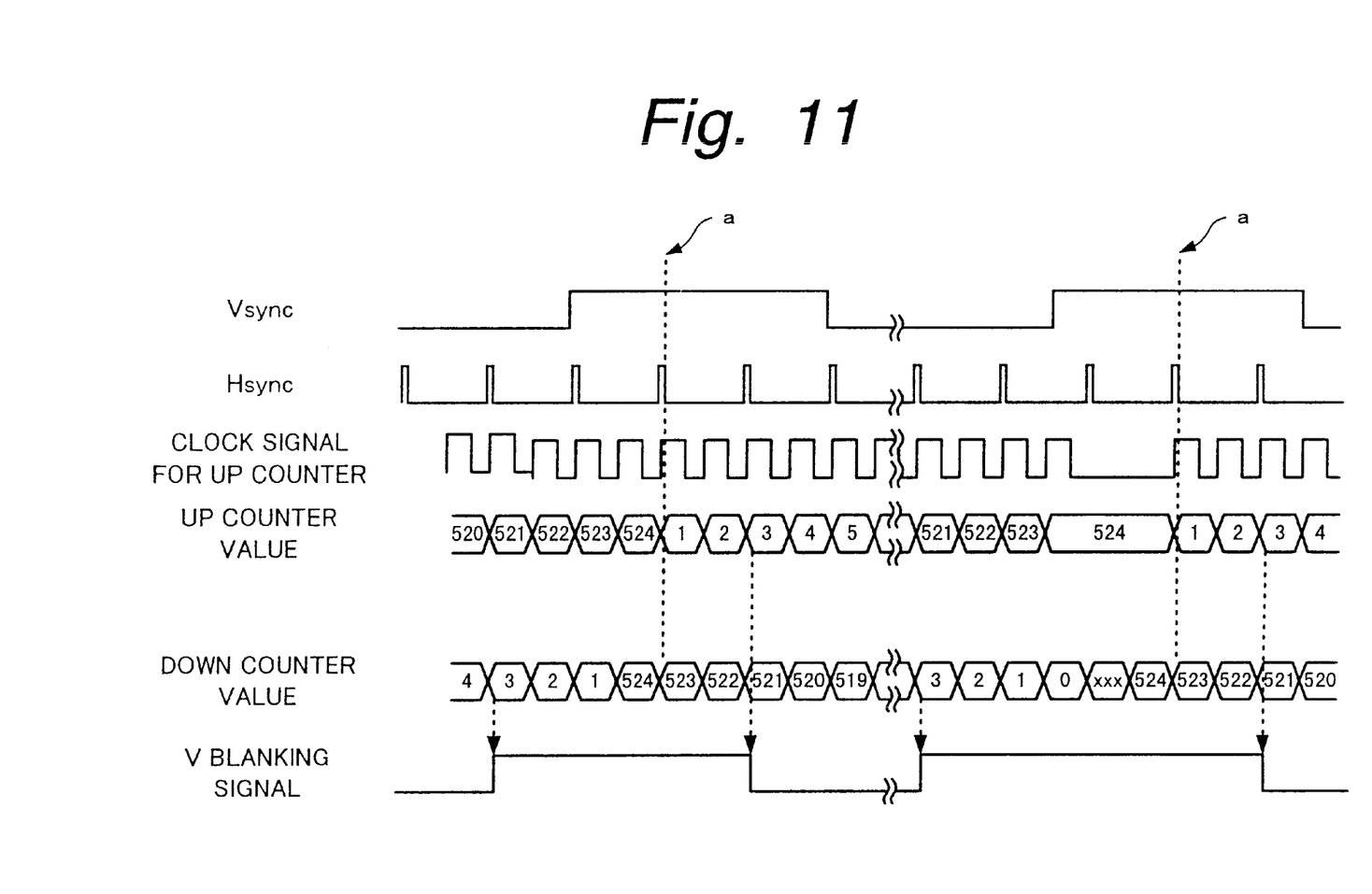
FIG. 11 is a timing chart of the second embodiment of the signal processing apparatus to which the present invention is applied.

In addition, the ODD/EVEN signal for switching over the fh clock signal is input to the clock counter 26 so as to control the clock signal supplied to the up counter 27. FIG. 11 shows the clock signal for the up counter 27, the count value of the up counter 27, the count value of the down counter 34, and the vertical blanking signal.

In the forced interlace mode, the vertical drive signal and the up counter 27 are reset at a timing deviated by a ½ horizontal interval for each vertical synchronous signal. In a field of which the up counter 27 is reset with a delay of a ½ horizontal interval, immediately before the up counter 27 is reset, the clock signal for the up counter 31 is stopped for one horizontal interval. During this period, the count value is loaded to the down counter 34. When the count value is set to the "beginning" of the count-down of the down counter 34, the count value thereof is kept as it is. Before the down counter 34 is reset, the count value is loaded. When the count value is set to the "beginning" of the count-down of the down counter 34, the down counter 34 counts the count value shown in FIG. 11. Thus, the period from three lines before the vertical synchronous signal to the three lines thereafter becomes the period for the vertical blanking signal. Thus, in each vertical synchronous signal, the "beginning position" and "end" position of the vertical blanking signal can be set corresponding to the count value "521" and the count value "3" of the up counter 27.

The second embodiment of the present invention is applied to the forced non-interlace mode of which the input interlace signal is forcedly locked to the state of a non-interlace signal. Alternatively, the second embodiment can be applied to the forced interlace mode of which an input non-interlace signal is forcedly locked to the state of an interlace signal.

According to the present invention, since the timings of the "beginning" position and "end" position of the vertical blanking signal can be freely set, any signal format can be dealt. In addition, the "beginning" position and "end" position of the vertical blanking signal can be easily set with the number of horizontal synchronous signals placed after and before the vertical synchronous signal.

According to the present invention, the forced lock mode of which the number of lines are varied for each vertical synchronous signal can be dealt. Thus, since the system that allows the "beginning" position and "end" position of the vertical blanking signal to be freely set can be used in any mode. Consequently, such a system can be widely used.

Having described specific preferred embodiments of the present invention with reference to the accompanying drawings, those are to be understood that the inventions are not limited to those precise embodiments, and that various changes and modifications may be effected therein by one skilled in the art without departing from the scope or the spirit of the invention as defined in the appended claims.

What is claimed is:

1. A signal processing apparatus for setting a vertical blanking signal of an input television signal, comprising:

a first counter, synchronized with a horizontal synchronous signal, for counting up a count value thereof starting from a first value corresponding to a predetermined clock signal whose frequency is higher than the frequency of the horizontal synchronous signal; and a second counter for counting down a count value thereof starting from a second value, wherein immediately before the count value of said first counter is reset at a particular timing corresponding to the vertical synchronous signal and the horizontal synchronous signal, said second counter loads the count value of said first counter as the second value, and wherein immediately before the second value is loaded to said second counter, the count value of said second counter becomes the first value.

2. A signal processing apparatus for setting a vertical blanking signal of an input television signal, comprising:

clock signal generating means, synchronized with a horizontal synchronous signal, for generating a second clock signal corresponding to a first clock signal and a field signal, the first clock signal operating at a frequency higher than the frequency of the horizontal synchronous signal;

a first counter for counting up a count value thereof starting from a first value corresponding to the second clock signal; and a second counter for counting down a count value thereof starting from a second value corresponding to the first clock signal, wherein immediately before the count value of said first counter is reset at a particular timing corresponding to a vertical synchronous signal and the second clock signal, said second counter loads the count value of said first counter as the second value.

3. The signal processing apparatus as set forth in claim 1 or 2, wherein the "beginning" position of the vertical blanking signal is detected from said second counter and the "end" position of the vertical blanking signal is detected from said first counter.

4. The signal processing apparatus as set forth in claim 1 or 2, wherein the first value is set to "1" so that the width of the vertical blanking signal is managed.

* * * * *